United States Patent Office 2,758,935
Patented Aug. 14, 1956

2,758,935

TREATMENT OF EGGS

Bernard M. Shaffer, Chicago, Ill., assignor, by mesne assignments, to Ben L. Sarett, Chicago, Ill.

No Drawing. Application March 16, 1953,
Serial No. 342,755

10 Claims. (Cl. 99—210)

My invention relates to the treatment of liquid egg products, especially liquid egg whites, and is concerned particularly with the preparation of dried egg whites having superior qualities and characteristics, notably in relation to their beating or whipping properties.

The processing of liquid egg products in order to produce dried products having satisfactory characteristics with respect to color, odor, keeping properties, whipping characteristics, sugar retention, and performance in such finished products as cakes, meringues, confections, and the like involves complex physico-chemical phenomena. Numerous procedures having as their objectives the production of superior dried egg products have heretofore been suggested. While such processes have brought about certain improvements, much was left to be desired.

It has heretofore been proposed to prepare dried egg products by a procedure comprising subjecting liquid egg products, particularly liquid egg whites, to an oxidation or oxygenation treatment in the presence of a glucose oxidase, or a glucose oxidase and catalase, for a period of time sufficient to effect certain changes, evidenced by a substantial reduction in the content of the free reducing sugars normally present in the liquid egg materials, after which the thus treated liquid egg materials are dried. Such procedures, while producing significant improvements in previously known processes, nevertheless have failed to present a solution to certain problems which have continued to vex producers of dried egg products.

If a liquid egg white, for instance, is subjected to treatment with glucose oxidase and catalase in the presence of hydrogen peroxide over a period of about 5 to 6 hours, at a temperature in the range of about 70–95 degrees F., preferably 80–85 degrees F., in accordance with heretofore known practices, and thereupon pan dried, the resulting dried egg white, when mixed with sucrose in a ratio of 1 part of dried egg white solids to 2 parts of sucrose, by weight, requires about 7 to 9 minutes of whipping or beating time to reach a stiff peak foam stage. If such a dried egg white is allowed to age for a period of time, for instance, of the order of several weeks to months, the beating time to reach a stiff peak tends to improve. However, such an aging procedure is undesirable from a number of standpoints among which is the fact that storage and equipment costs are increased and such procedure is, therefore, commercially impracticable. The beating or whipping time to reach a stiff peak foam stage may be determined in a variety of ways. The times here mentioned were based upon a procedure involving admixing 108 grams of a mixture containing ⅓ dried egg whites and ⅔ sucrose with 270 ml. water, initially mixing the same for 2 minutes at low speed in a "Sunbeam Mixmaster," and then mixing at high speed until a stiff peak foam is obtained. The time of mixing at high speed to obtain a stiff peak foam is taken as the measure of the time to reach a stiff peak.

I have discovered that rapid beating or whipping properties, namely, about 1½ to 4 minutes to reach a peak, are imparted to glucose oxidase or glucose oxidase-catalase treated egg whites without undergoing any aging treatment. This is accomplished by incorporating substantial quantities of sucrose into the glucose oxidase or glucose oxidase-catalase treated liquid egg material, for example, from about 1 part of sucrose for each 4 parts of egg white solids up to about 2 parts of sucrose for each 1 part of egg white solids, said parts being by weight. A particularly preferred range is about 3 parts of sucrose to about 4 to 5 parts of egg white solids. Worded otherwise, the amount of sucrose utilized ranges from about 25% to about 200%, by weight, of the egg white solids, the particularly preferred range being from about 75% to about 125%, by weight, of sucrose to the egg white solids. The invention is particularly useful in the production of dried egg whites or albumen from said glucose oxidase-catalase treated liquid egg whites. The resulting dried egg white or albumen is particularly advantageous for the production of Angel Food cakes but it can, of course, be employed with excellent results in the production of other foods, baked goods and the like, such as meringues, candies and other confections, in which egg albumen is conventionally utilized. The addition of the sucrose to the glucose oxidase or glucose oxidase-catalase treated liquid egg whites results in the production of a dried egg albumen, especially a pan dried egg albumen, with a considerably improved color and substantially lower bacterial content than characterizes similarly dried aged products and, at the same time, as stated above, said dried egg albumen of my present invention is characterized by a rapid beating or whipping time to reach a stiff peak.

My invention is to be sharply distinguished from heretofore broadly known procedures wherein ordinary liquid eggs have been admixed with sugars such as sucrose and the resulting mixtures then concentrated or dried. Typical of such known procedures are disclosed, for instance, in U. S. Patents Nos. 184,479; 1,076,227; 1,203,-983; 1,842,733 and 2,377,644. None of said prior procedures in any way involves glucose oxidase or glucose oxidase-catalase treated liquid egg whites nor is any of said procedures in any way related to or concerned with the problem of enhancing the beating or whipping time of such treated egg whites.

In the practice of my invention, the liquid egg whites, which, for example, may be fresh liquid egg whites or frozen and thawed liquid egg whites, are subjected to treatment with glucose oxidase or glucose oxidase and catalase in the presence of an oxidizing agent, particularly hydrogen peroxide. The treatment is carried out for a period of time sufficient to effect a reduction of at least 50% of the content of free reducing sugars present in the liquid egg material and, more particularly, to decrease the content of free reducing sugars at the end of the processing to in the range of about 0.01% to 0.03% and, better still, to not over 0.01%, by weight, based on the weight of the liquid egg material. On the dried egg basis, say dried egg whites, this latter figure represents about 0.1% of free reducing sugars. Upon completion of such treatment, sucrose is added to the liquid egg whites in amounts of the order stated above and the mixture is thereupon dried in any suitable manner as, for instance, by known pan drying, belt drying, foam drying, or spray drying procedures. The necessity for extensive aging periods is eliminated with the concomitant elimination of the disadvantages attendant upon its use.

The following examples are illustrative of the practice of my invention. It will be understood that various changes may be made, within the spirit and scope of my teachings, as, for example, in the selection of glucose oxidase and catalase preparations, in the proportions thereof utilized, in the preliminary treatment accorded the liquid egg white products, and the like. The examples are, therefore, not to be construed in any way as limitative of the scope of my invention. The particular glucose oxidase employed was a commercial product sold under the name "Deoxygenase" which contained glucose oxidase and catalase.

*Example 1*

To 2000 ml. of homogenized liquid egg white, previously neutralized with lactic acid to pH 7, there is added, with constant stirring, 5.0 ml. of 30% hydrogen peroxide and 10 ml. of the glucose oxidase-catalase preparation. Three further additions, in each case of 4.0 ml. of 30% hydrogen peroxide, are made at 15 minute intervals. At the end of 2 hours the free reducing sugar content is 0.2 mg./ml. and at the end of 4 hours the free reducing sugar content is 0.1 mg./ml. Thereupon, to the resulting liquid egg product 250 grams of sucrose are added and the mixture is promptly pan dried. When equal parts of such dried egg whites and sucrose are admixed and whipped or beaten in an aqueous medium, a stiff peak is obtained in 3 minutes.

*Example 2*

To 10 pounds of homogenized liquid egg whites having a pH of about 9, a sufficient amount of lactic acid is added to bring the pH down to 7. Thereupon, 11.5 ml. of 30% hydrogen peroxide are added followed by the addition of 23 ml. of the glucose oxidase-catalase preparation. Three further additions of 8.0 ml. portions of hydrogen peroxide are made at 15 minute intervals. The temperature is maintained at 78 to 81 degrees F. At the end of 6 hours, the free reducing sugar is about 0.03%. To the resulting liquid egg product, 1 pound of sucrose is added and the mixture is thereupon pan dried. Its properties are similar to those of Example 1.

*Example 3*

This example is carried out in exactly the manner described in Example 2 except that, prior to the addition of the sucrose, the oxidized liquid egg whites are acidified to pH 6.0 with lactic acid, the insolubles which form are removed, and the resulting clear liquid egg white product, after the addition thereto of the sucrose, is thereupon pan dried. Its properties are excellent.

*Example 4*

To 5000 pounds of liquid egg whites, previously neutralized to a pH of 7 by the addition of lactic acid, there is added, with stirring, an aqueous solution prepared by eluting the glucose oxidase and catalase from 0.55 pound of powdered "Deoxygenase" preparation (containing, adsorbed on a carrier, 1500 glucose oxidase units per gram of said preparation and sufficient catalase to liberate oxygen from the amount of hydrogen peroxide necessary for the desired reaction). Then 15 pounds of 35% hydrogen peroxide is added gradually over a period of 1 hour, and then 15 more pounds of 35% hydrogen peroxide is added gradually over a period of 4 hours, the mixture being stirred continuously or from time to time. Promptly upon the completion of the approximately 5 hour period, 625 pounds of sucrose is added and, as soon as the sucrose is dissolved, the mixture is dried, by pan or spray drying.

My invention is especially applicable to the treatment of liquid egg whites for the production of dried egg albumen. In its broader aspects, however, my teachings can be used with advantage, for producing exceptionally satisfactory products, in connection with the treatment of whole eggs, egg yolks, and mixtures of whites and yolks in variant proportions. The term "egg liquid" is, therefore, used hereinafter in a generic sense to encompass liquid egg whites, liquid egg yolks, liquid whole eggs and mixtures of whites and yolks in various proportions.

The following examples are illustrative of the practice of the method on whole eggs and on egg yolks.

*Example 5*

To 1000 ml. of liquid whole eggs, there is added, with stirring, 2.0 ml. of 30% hydrogen peroxide and 3 ml. of the glucose oxidase-catalase preparation. A further addition of 2.0 ml. of 30% hydrogen peroxide is made after 15 minutes. At the end of 5 hours the free reducing sugar content is 0.2 mg./ml. To the resulting liquid egg product there are added 200 grams of sucrose and the mixture is then pan dried.

*Example 6*

To 1000 ml. of fresh liquid egg yolks, there is added, with stirring, 1 ml. of 30% hydrogen peroxide and 3.0 ml. of the glucose oxidase-catalase preparation. A further addition of 1.5 ml. of 30% hydrogen peroxide is made after 15 minutes. At the end of 4½ hours the free reducing sugar is 0.15 mg./ml. To the resulting liquid egg yolks there are added 225 grams of sucrose and the mixture is then pan dried.

The sugar determinations were based on the methods disclosed in J. Biol. Chem. 153, 375–380 (1944), and 160, 61–68; 69–73 (1945).

While the method of my present invention is applicable to the treatment of fresh or untreated egg liquid, it is, in general, preferred to subject the egg liquid, particularly the liquid egg whites, to a preliminary neutralizing treatment before subjection to the action of the glucose oxidase-catalase and oxidizing agent. Fresh liquid egg whites, for example, have a pH of about 9. It is usually advantageous if the fresh liquid egg whites are preliminarily acidified to produce a pH within the range of optimum activity of the particular glucose oxidase-catalase preparation used. In general, a pH of about 6.5 to 7.5, say 7.3 to 7.5, will be found to represent a good range of pH adjustment prior to the egg liquid being subjected to treatment in accordance with my invention. It will also be understood that pasteurizing, filtering and like steps, can be utilized in conjunction with the process of my invention. Thus, for example, the egg liquid can be pasteurized before or after treatment with the glucose oxidase-catalase and oxidizing agent, or both before and after such treatment. The drying step is carried out by pan drying or spray drying or other known drying procedures. Furthermore, before or after the oxidizing treatment and before drying, additions of various kinds can be made, over and above the addition of the sucrose, as, for example, glycerin, monoglycerides of higher fatty acids, monostearin sulfoacetate, etc. Again, after the oxidizing treatment, it is frequently advantageous to acidify the liquid egg material with lactic, hydrochloric, or other acid materials to a pH sufficient to produce insoluble substances, for instance a pH of about 4.8 to about 5.2, said insoluble substances then being removed by filtration or centrifuging and the resulting liquid egg product, after the addition of the sucrose, then being promptly spray dried.

Various innocuous or non-toxic oxidizing agents can be used in the practice of my invention. Thus, for instance, oxygen, air, or other oxygen-containing gases can be employed; and peroxy compounds such as sodium peroxide, hydrogen peroxide, urea peroxide, sodium percarbonate, sodium perpyrophosphate and sodium persulfate are especially suitable. In general, the oxidizing agent or agents should be such as do not leave a residue or an objectionable residue in the egg product. Hydrogen peroxide is particularly satisfactory and, when it or similar peroxy compounds are utilized, a glucose oxidase having catalase activity as well, or a mixture of a glucose oxidase with a catalase preparation, is employed.

The proportions of glucose oxidase and oxidizing agent, in relation to the quantity of liquid egg product treated, are variable and are used in accordance with existing practices. The effectiveness or extent of activity of any particular glucose oxidase preparation and the purity of the glucose oxidase are, obviously, significant factors as is also the desideratum of speed of carrying out the process. Similar considerations apply to the oxidizing agent. In any event, the proportions are not critical although it will be understood that practical and economic considerations will govern the conditions under which this aspect of the method is carried out. Generally speaking, the proportions of glucose oxidase preparation and oxidizing agent are a distinctly minor percentage of the quantity of liquid egg product being treated or processed.

It will be understood that the length of time of treatment of the liquid egg products is somewhat variable, depending, among other things, upon the degree of activity of the glucose oxidase preparation employed, the proportions thereof utilized in relation to the amount of liquid egg product, the pH of the medium, the temperature of treatment, the degree of stirring or agitation, the type of oxidizing agent employed, and the exact results desired. Generally speaking, one desideratum is to complete the treatment in as short a period of time as possible. To this end, larger proportions of glucose oxidase speed up the process. Economic considerations, however, may dictate the utilization of somewhat longer treatment periods with the use of lesser proportions of glucose oxidase. Treatment periods may vary from about one-half hour to perhaps 8 to 10 hours or slightly more, with a good average in the neighborhood of 4 to 8 hours.

The term "glucose oxidase" is used in a generic sense to encompass oxidases which have the property of converting reducing sugars to their corresponding and lower acids, for example, glucose to gluconic acid, under conditions of oxidation. The term "glucose oxidase" is also intended to include the correspondingly functioning dehydrogenases, it being understood, in this connection, that in certain instances, at least, no line of demarcation has been drawn between an oxidase and a correspondingly functioning dehydrogenase. The glucose oxidases are derived from molds, bacteria and the like in accordance with known procedures, typical examples of such oxidases being penatin, notatin, and penicillin B. Various commercial glucose oxidase preparations are available on the market. The preparations are available in the form of a clear aqueous solution or as a powder and, in addition to possessing glucose oxidase activity, they also possess catalase activity. In this connection, it may be noted that glucose oxidase preparations which also possess other activities can be used in the practice of my invention so long as they have appreciable glucose oxidase properties.

What I claim as new and desire to protect by Letters Patent of the United States is:

1. In a process of preparing dried egg whites wherein liquid egg whites are processed by subjection thereof to oxidation in the presence of a glucose oxidase and catalase for a period sufficient to reduce substantially the content of free reducing sugars therein, the step of improving the whipping properties of said egg whites which comprises adding sucrose to the aforesaid processed liquid egg whites and then drying the resulting mixture, the amount of sucrose utilized constituting from about 25% to about 200%, by weight, of the egg white solids.

2. In a process of preparing dried egg whites wherein liquid egg whites are processed by subjection thereof to oxidation with an innocuous peroxy compound in the presence of a glucose oxidase and catalase for a period sufficient to reduce the content of free reducing sugars to not more than about 0.1%, based on the weight of the egg white solids, the step of improving the whipping properties of said dried egg whites which comprises adding sucrose to the aforesaid processed liquid egg whites and then drying the resulting mixture, the amount of sucrose utilized constituting from about 25% to about 200%, by weight, of the egg white solids.

3. In a process of preparing dried egg whites wherein liquid egg whites are processed by subjection thereof to oxidation with hydrogen peroxide in the presence of a glucose oxidase and catalase for a period sufficient to reduce the content of free reducing sugars to less than 50% of the normal content thereof, the step of improving the whipping properties of said dried egg whites which comprises adding sucrose to the aforesaid processed liquid egg whites and then drying the resulting mixture, the amount of sucrose utilized constituting from about 75% to about 125%, by weight, of the egg white solids.

4. In a process of preparing dried egg whites wherein liquid egg whites are processed by subjection thereof to oxidation with hydrogen peroxide in the presence of a glucose oxidase and catalase for a period sufficient to reduce the content of free reducing sugars to less than 0.03%, based on the weight of the liquid egg material, the step of improving the whipping properties of said dried egg whites which comprises adding sucrose to the aforesaid processed liquid egg whites and then pan drying the resulting mixture, the amount of sucrose utilized constituting from about 75% to about 125%, by weight, of the egg white solids.

5. In a process of preparing egg whites wherein liquid egg whites are processed by subjection thereof to oxidation with hydrogen peroxide in the presence of a glucose oxidase and catalase for a period sufficient to reduce the content of free reducing sugars to less than 50% of the normal content thereof, the step of improving the whipping properties of said egg whites which comprises adding sucrose to the aforesaid processed liquid egg whites in an amount constituting from about 25% to about 200%, by weight, of the egg white solids.

6. In a process of preparing dried egg whites wherein liquid egg whites are processed by subjection thereof to oxidation with an innocuous oxygen-containing gas in the presence of a glucose oxidase for a period sufficient to reduce the content of free reducing sugars to less than 50% of the normal content thereof, the step of improving the whipping properties of said dried egg whites which comprises adding sucrose to the aforesaid processed liquid egg whites and then drying the resulting mixture, the amount of sucrose utilized constituting from about 25% to about 200%, by weight, of the egg white solids.

7. In a process of preparing egg whites wherein liquid egg whites are processed by subjection thereof to oxidation with an innocuous oxygen-containing gas in the presence of a glucose oxidase for a period sufficient to reduce the content of free reducing sugars to less than 50% of the normal content thereof, the step of improving the whipping properties of said egg whites which comprises adding sucrose to the aforesaid processed liquid egg whites in an amount constituting from about 25% to about 200%, by weight, of the egg white solids.

8. In a process of preparing egg products wherein egg liquid is processed by subjection thereof to oxidation in the presence of a glucose oxidase and catalase for a period sufficient to reduce substantially the content of free reducing sugars therein, the step of improving the properties of said egg products which comprises adding sucrose to the aforesaid processed egg liquid in an amount constituting from about 25% to about 200%, by weigth, of the egg solids.

9. In a process of preparing dried egg products wherein egg liquid is processed by subjection thereof to oxidation with hydrogen peroxide in the presence of a glucose oxidase and catalase for a period sufficient to reduce the content of free reducing sugars to less than 50% of the normal content thereof, the step of improving the properties of said dried egg products which comprises adding sucrose to the aforesaid processed egg liquid and then drying the resulting mixture, the amount of sucrose utilized constituting from about 25% to about 200%, by weight, of the egg solids.

10. In a process of preparing dried egg products wherein egg liquid is processed by subjection thereof to oxidation with an innocuous oxygen-containing gas in the presduce the content of free reducing sugars to less than 50% of the normal content thereof, the step of improving the properties of said dried egg products which comprises adding sucrose to the aforesaid processed egg liquid and then drying the resulting mixture, the amount of sucrose utilized constituting from about 25% to about 200%, by weight, of the egg solids.

References Cited in the file of this patent

UNITED STATES PATENTS

| | | |
|---|---|---|
| 2,168,926 | Littlefield | Aug. 8, 1939 |
| 2,236,773 | Fischer | Apr. 1, 1941 |
| 2,427,726 | Hopkins et al. | Sept. 23, 1947 |
| 2,610,918 | Kline et al. | Sept. 16, 1952 |